(12) United States Patent
Good et al.

(10) Patent No.: US 12,691,713 B2
(45) Date of Patent: *Jul. 28, 2026

(54) MULTIPLE HITCH ASSEMBLY

(71) Applicant: Advanced Engineering Group, LLC, Valencia, CA (US)

(72) Inventors: Jeff Good, Cayucos, CA (US); Arvinder Singh, Valencia, CA (US); Hardeep Singh, Valencia, CA (US)

(73) Assignee: Advanced Engineering Group, LLC, Valencia, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 18/202,951

(22) Filed: May 28, 2023

(65) Prior Publication Data

US 2023/0294467 A1     Sep. 21, 2023

Related U.S. Application Data

(63) Continuation of application No. 17/223,889, filed on Apr. 6, 2021, now Pat. No. 11,660,916, which is a continuation-in-part of application No. 16/518,471, filed on Jul. 22, 2019, now Pat. No. 11,628,698.

(60) Provisional application No. 62/711,771, filed on Jul. 30, 2018.

(51) Int. Cl.
B60D 1/24 (2006.01)
B60D 1/50 (2006.01)

(52) U.S. Cl.
CPC .............. B60D 1/249 (2013.01); B60D 1/50 (2013.01)

(58) Field of Classification Search
CPC ... B60D 1/06; B60D 1/46; B60D 1/50; B60D 1/241; B60D 1/249
USPC ........................................ 280/504
See application file for complete search history.

*Primary Examiner* — Valentin Neacsu
*Assistant Examiner* — Felicia L. Brittman-Alabi
(74) *Attorney, Agent, or Firm* — Ruth Lynette Wylie

(57) ABSTRACT

A height adjustable multiple hitch assembly including a shank hitch channel platform and a tow mount member with a base block configured for squared alignment within the channel having opposed flanges with aligned pairs of side holes, the block blasé having a plurality of through holes for engaged coupling with corresponding aligned side holes by a fastening member to thereby reduce the movement between the hitch platform and tow mount member that may be enhanced by a dampener member attached to a rear planar surface of the block base or a recessed column of the channel member.

20 Claims, 8 Drawing Sheets

MULTIPLE HITCH ASSEMBLY

CROSS-REFERENCE TO RELATED APPLICATIONS

This application claims priority to and benefit under 35 USC § 119(e) of U.S. patent application Ser. No. 17/223,889 having a filing date of Apr. 6, 2021, of U.S. patent application Ser. No. 16/518,471 having a filing date of Jul. 22, 2019 issued as U.S. Pat. No. 11,628,698 on Apr. 18, 2023, which claims priority to and benefit under U.S. Provisional Patent Application Ser. No. 62/711,771 having a filing date of Jul. 30, 2018, which are both hereby incorporated by reference herein.

FIELD OF THE INVENTION

This invention relates to the field of tow accessories having hitch ball receivers, particularly relating to a multiple hitch assembly having a dampening mechanism for reducing the relative movement and rattling between a tow accessory base and hitch receiver.

BACKGROUND OF THE INVENTION

Many vehicles today are equipped with receiver-type trailer hitches. These types of trailer hitches typically are a square tube, normally 1¼" or 2" internal height and width, attached to the undercarriage of the vehicle. A second tube acts as a shank and includes outer dimensions slightly smaller than the internal dimensions of the receiver tube and is slidable within the receiver tube. The shank member is connected to the receiver tube by a secured pin inserted through the two tubes.

The shank member may include a standard single or dual ball-mount for engaging with the hitch of a trailer or other wheeled vehicle. Another popular use for receiver hitches is the use as a coupling device for installing equipment racks, ski carriers, storage boxes and other types of carriers having a second tube dimensioned to engage within a receiver hitch tube. This provides a universal system that allows a vehicle user to be able to use various trailer and carriers with a single coupling system.

A particular problem with the use of these receiver coupling systems is play between the receiver hitch platforms and hitch ball or direct tow accessory assemblies. The base of the tow mount or accessory tends to rattle or chatter within the channel of the hitch platform. This rattle or chatter is at best an annoyance and at worst can distract the driver or cause damage to the trailer or the carrier.

There have been a number of attempts to solve this problem in the past. Such attempts typically required the use of specially designed receivers, shanks, or mechanisms that typically adapt size and fasteners to stabilize junctures between hitch assemblies.

One such prior art hitch assembly addressing the latter problems is shown in the prior art height adjustable dual hitch ball flange platform assembly shown, described and claimed in U.S. Pat. No. 8,033,563. The latter patented hitch assembly employs two locking pins on an upper and lower section of the dual hitch ball base inserted through corresponding holes in the double flanges to secure and stabilize the hitch ball base at an appropriate height within a vertical channel formed between two outwardly extending flanges.

Although the latter dual pin mount provided the substantial improvements of reduced play, rattling and pivoting of the hitch assembly relative to the vehicle, movement and vibration due to loosening and play between the tow accessory member and hitch receiver platform persists. The movement and noise are exacerbated if the tow accessory is installed on an upper or lower section of the channel and thus not evenly supported along the base of the tow accessory. Such eccentric positioning of the hitch ball along the hitch platform channel and resulting movement causes vibrations and gyrating movement. In extreme driving terrain or weather conditions, even hazardous swaying of the vehicle may result.

Prior art devices further include inserting a rubber device into apertures of a universal tow platform, which preferably fills three apertures adjacent to opposing sides and rear surface or the hitch accessory to snugly secure the hitch ball and thereby dampen movement and rattling. However, since the rubber device is installed in the hitch platform, the hitch ball may not align the rubber device in all position, particularly if used with a dual flange ball that is installed on the uppermost or lowermost portion of the platform.

Although the latter device provided an improvement over prior art hitch assemblies and reduced rocking, swaying and pivoting of the hitch assembly relative to the vehicle, issues arising from loose rattling between the tow accessory member and hitch receiver platform persists. As is readily surmised from consideration of impacts and resulting external forces exerted upon a vehicle and any towed accessory will shake and exert commensurate stress loosening abutting rigid metal surfaces of the hitch assembly and will resonate toward edges of the hitch ball base and platform, resulting in rattling and possible swaying of the vehicle.

Such vibration, noise and directional interference with safely steering the car may be exacerbated if the hitch ball or tow accessory are not tightly compressed along the channel of the platform. This is particularly problematic if the hitch ball mount tow accessory is installed on an uppermost or lowermost end of the channel where the entire length of the hitch ball mount base is not supported along the channel of the tow accessory, which is a particularly prevalent issue associated with dual flange ball. When in upper and lower mounted positions, the base may extend beyond the channel and flanges support exacerbating movement causing rattling and vibrations and may even cause veering, swaying, gyrating and even dangerous pivoting to one side or another of the vehicle that is difficult. This rattle or chatter is at best an annoyance and at worst can distract the driver or cause damage to the vehicle or tow accessory. In extreme driving terrain or weather condition, the swaying or pivoting of the vehicle may be impossible to control.

The drawbacks of unattenuated rattle or sway may be exacerbated when multi-purpose hitch mounts with more complex structures are used. In particular, triple ball hitches have socket-type balls in a variety of sizes that are typically engineered by soldering or welding fitted surfaces of the respective balls. Hence a single hitch mount can be used to hitch a corresponding socket of a trailer can be hitched to the tow vehicle. Three common sizes of balls are, for example, 1⅞", 2", or 2⁵⁄₁₆", but other sizes may be used in a hitch member adapted to be received in a hitch receiver that is attached to the tow vehicle. A pin that secures the main hitch member to the hitch receiver and transmits force exerted by tension and load exerted by a trailer movement. In such triple ball conventional hitches, another type of a hitch (such as a clevis or a hook hitch) may be provided on a fourth side of the main hitch member, such that another type of a trailer not having a ball hitch may be mounted on the tow hitch assembly.

A yet further feature combined with tow mounts are hitch steps to facilitate access to spaces on or in the towing vehicle that are out of reach, such as, for example, in truck beds, rooftops or utility vehicle stowage areas. The multifunctionality imparted to so merging variously sized balls together with a step in a single hitch mount provides obvious efficacies such as convenience of having a single multi-use device saving stowage space and fewer pieces to track and find when needed. However, drawbacks associated with the bulk and density as well as piecemeal joining, typically by soldering or welding, of corresponding mated surfaces of the each of the three balls as well as the step may compromise the strength and durability of conventional triple ball mounts. Unfortunately, the impact and torque exerted by the physical load together with the vibration and pressure from the pulling and pushing on the adjoined surfaces and fastener pins of conventional triple ball tow hitch may erode and loosen the adjoined surfaces of components of conventional multiple function hitch mounts thereby compromising their strength, durability and safety.

Moreover, the bulk and density of such multifunctional tow mounts exacerbate the vibrational rattle and sway caused by friction between abutting metal surfaces of the hitch and socket and attachment hardware, such as fastener pins that secure the telescoped tow shank into the receiver of the towing vehicle. Hence, the dampening device and method described and claimed in application Ser. No. 16/518,471 of which this is a continuation in part. and is incorporated herein, is particularly efficacious when applied to conventional triple ball hitches particularly when also equipped with a step.

Yet another disadvantage attendant to conventional mounts for triple ball mounts is the lack of height adaptability. Thus, although the variously sized balls accommodate different socket sizes of tow accessories, they are not adjustable to the height of a particular trailer or other equipment being towed. Towing vehicle hitch heights, for example, between a highly suspended, four-wheel pickup truck as compared to a standard car, may vary considerably. Trailers and other towed equipment and their tow bars also vary in height. This is a particular problem if the towing vehicle hitch receiver sits relatively low to the ground and alternatively a relatively high trailer exerts a lifting action on the back end and wheels while the front is pushed downwardly. In the latter situation, the towed load pressure could cause reverberations and involuntary directional pulls that could ultimately cause the driver of the towing vehicle to lose control and even result in an accident.

Hence, there persists a need for a more durable multiple use hitch mount built to withstand the load pressure and vibrational rattle and torque and is height adjustable in order to better attenuate the play between the hitch assembly platform and base of the hitch ball member and associated noise, vibration and sway.

SUMMARY OF THE INVENTION

Addressing such and other drawbacks, the present invention relates to a multiple hitch assembly that reduces movement between a hitch platform and a hitch mount member. The inventive configuration enhances in-line tracking of a tow accessory or trailer behind a tow vehicle and attenuates movement between a tow mount base and hitch platform junction, thereby reducing associated play, vibration and resulting rattling and sway.

In the embodiments described and claimed herein, the multiple hitch assembly has a shank hitch platform with an end configured for telescoped seating within a receiver tube attached to a vehicle and a channel portion including an inner recessed column perpendicularly disposed between opposed flanges with side holes spaced in corresponding paired alignment. The multiple tow mount member has a block base and a receiver or tow mount member opposite the block base. The block base portion has a planar rear surface having a dampener member and at least one through hole, that may in exemplary embodiments be two through holes configured for aligned correspondence with corresponding side holes in the opposed flanges of the shank hitch platform. One or more elongated pins configured for coupled engagement of a through hole of the block base between the side holes of the shank member squarely aligns the block base within the opposed flanged and recessed column of the shank hitch platform so as to enhance in-line tracking of a towed accessory or trailer with the tow vehicle.

The vibration dampener pad material according to the present invention may be composed of an elastomeric or any pliable or flexible material capable of absorbing impacts, vibrations and attenuating movement between abutting and adjacent surfaces of a receiver ball or other tow accessory and a hitch receiver. One exemplary embodiment of the dampener member includes a rubber or elastomer.

Further features and particular efficacies of the present invention are drawn toward a multiple hitch assembly for mounting a tow accessory or a trailer to a tow vehicle having a dampener pad for reducing the vibration noise and rattle emanating from the hitch platform and the multiple hitch member, that may be exacerbated with the added mass and density of the multiple tow member and pressure of heavy trailers or loads often towed by such assemblies. The channel member has a plurality of spaced pairs of aligned side holes disposed in the opposed flanges and is configured for slidable seating of a block base of a multiple tow hitch member having a block having at least one through hole for locking into aligned correspondence with the aligned side holes. On a receiver end opposite the rear planar surface of the block base is a unitary distal pedestal having a plurality of radially disposed tow accessory mounts.

A locking member is configured for coupling the through hole of the base portion between the aligned side holes such that locked engagement of the locking member with the side holes compresses the rear planar surface and side walls of the block base against a corresponding portion of the recessed column and opposed flanges of the channel member of the shank hitch platform. The locking member may be one or a plurality of pins. A clip coupled to an aperture on the end of the pin forming a cotter pin may be deployed to secure the pin(s) in coupled engagement.

In preferred embodiments, the plurality of hitch mounts includes three hitch receiver balls of different dimensions. The hitch ball receivers are in such preferred embodiments standard size ball hitches of 1.25×1.25 inches (3.2×3.2 cm), 2×2 inches (5×5 cm), 2.7×2.7 inches (5.6×5.6 cm). Alternative embodiments may combine or substitute standard for irregular size hitch mounts. In addition, a hook member, pintle hook or alternative receiver mechanisms may be combined with the multiple hitch mount assembly of the present invention.

The multiple hitch assembly may also include a step member. In some embodiments, two of the three hitch receiver balls are disposed in opposed transverse orientations and the step member is disposed in opposed transverse orientation to another of the three hitch receiver balls. In various embodiments, the step member is a planar surface of a generally rectangular configuration dimensioned to accommodate one foot or both feet of a user. An upper surface of the step member may further include skid resistant indentations.

A yet further feature of the present invention is the dimensioning and spacing of one or more through holes of the block base such that the hitch assembly member may be detachably coupled to the channel member of the hitch platform so as to alternatively adjust the height of the multiple hitch assembly while the hitch platform is in coupled engagement with the tow vehicle. Embodiments also include dimensioning the block base such that the locking member is capable of detachably coupling the through holes so as to detachably couple the multiple tow hitch member to selectively orient a one of the hitch balls and step in an upward use position while the hitch platform is in coupled engagement with the tow vehicle.

As further described and illustrated herein, embodiments further affix a dampener pad or material to a portion of the coextensive surfaces of the block base of the multiple tow mount member and the recessed column of the channel member so as to reduce movement and rubbing therebetween. Some embodiments include dampener member affixed onto the rear surface of a block base of a multiple tow mount member such as, for example, a dual or triple ball hitch mount or receiver. Other embodiments may affix the dampener member upon an inner surface of the recessed column disposed between opposed flanges of a hitch platform. By thus affixing the dampener member to the rear surface of the tow mount member or shank hitch platform, the dampening of movement and frictional rubbing of the hitch platform and the hitch multiple tow mount member or receiver is deployed in all positions regardless height adjustments thereto.

In various embodiments, the dampener member may be adhered, fused, coated or screwed onto a respective surface. Some embodiments provide a detachable dampener member that may be applied to original equipment lacking the dampener member.

Representative embodiments of such multiple hitch assemblies particularly suitable for after-market applications includes a combination of rubber and metal screw thread configured to engage a corresponding threaded hole the back surface of a corresponding base block or inner surface of a hitch platform recessed column.

As used herein, "tow mount member", "multiple tow mount member" or "multiple mount" refers to an adjustable single, dual, triple or any hitch ball mount, a J-shaped hook, pintle hook, a clevis hook, a pintle ring, a D-shaped aperture, or other hitch mount member. This "multiple hitch accessory is adaptable to various tow accessories including a trailer or carrier such as a bicycle or recreational equipment racks, ski carriers, storage decks, boxes, cages or bags and other types of carriers and has a height adjustable hitch platform capable of being adapted to the height of a particular tow accessory while coupled within a receiver tube attached to a vehicle. As shown and described herein, "multiple hitch member" may optionally include a step member for facilitating access to a rooftop surface and elevated objects not readily reached from ground level.

These and other features will be evident from the ensuing detailed descriptions of representative exemplary embodiment below and from the drawings.

DETAILED DESCRIPTION OF VARIOUS EMBODIMENTS

Figure 1:
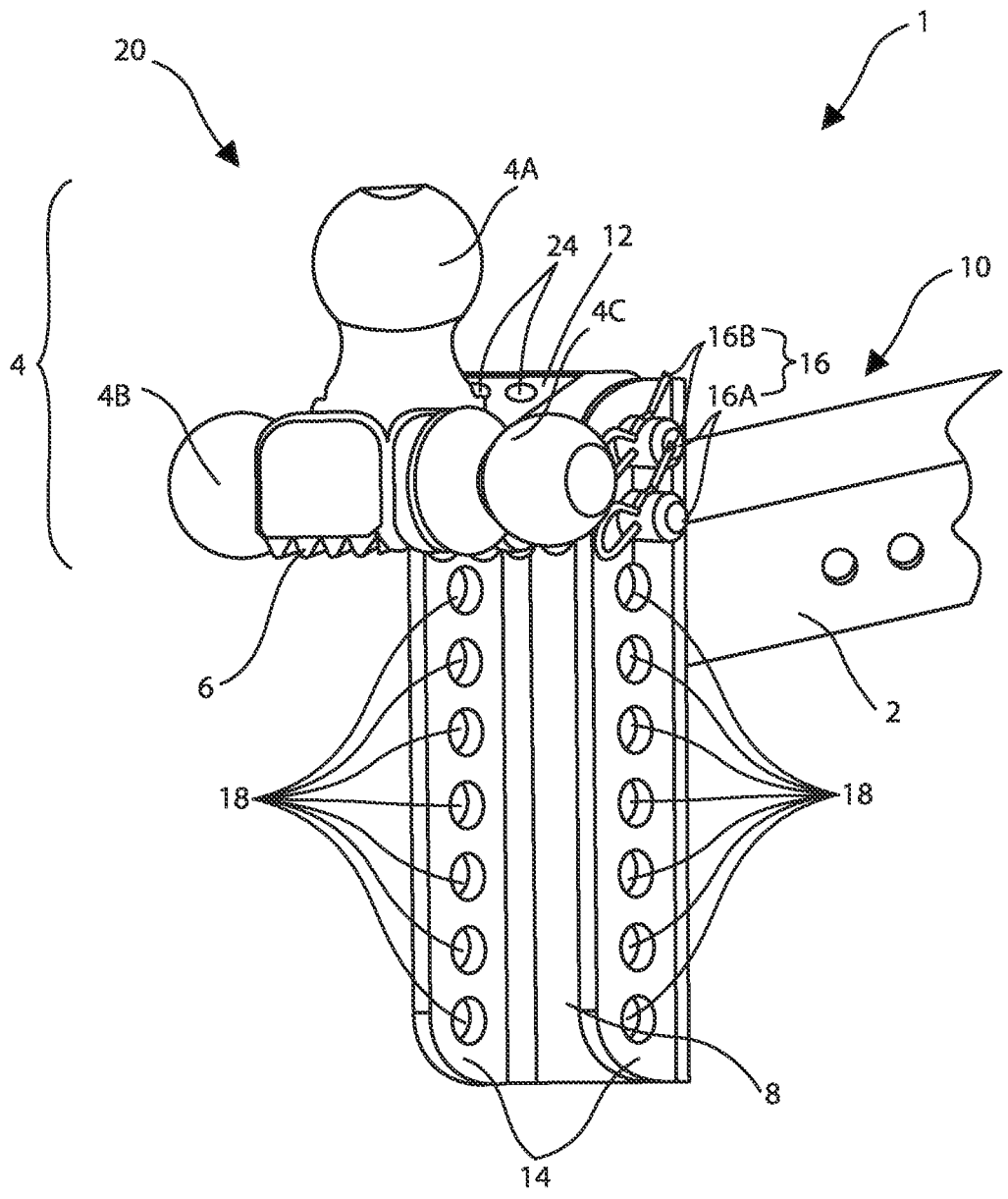
FIG. 1 is a side perspective view of a first exemplary embodiment of the inventive multiple hitch assembly.

It is to be expressly understood that the illustrative embodiment is a representation of the invention for explanatory purposes only and is not meant to unduly limit the claimed invention. The representative embodiment of the present invention is intended for use with receiver hitch systems including trailer mounts but also includes other dual or triple hitch mount configurations with or without a step hitch member such as detailed below. The illustrated as well as alternative embodiments may be used for original equipment installations and as an after-market accessory.

In exemplary embodiments shown in FIGS. 1-6, multiple hitch assembly 1, 1', 1" includes a hitch platform 10 having an elongate shank end portion 2 configured for telescoped coupled engagement within a corresponding receiver tube mounted beneath a bumper of a tow vehicle (not shown) by well-known mounting techniques, such as by bolting or welding. In the illustrated embodiment, a platform shank tube 2 is sized and configured for telescoped seating within a 1.5-inch square or 2-inch receiver tube (internal dimensions). As is readily apparent, the hitch dampener assembly of the present invention may be employed with other sizes or shapes of hitch receiver tubes.

Hitch platform 10 has a channel member 8 with a recessed column disposed between opposed flanges 14. Channel member 8 is affixed to a back surface of the recessed column such that the channel member 8 is longitudinally disposed along a substantially perpendicular axis opposite elongate end portion 2 of shank tube member 10. Channel member 8 has opposed flanges 14 with a plurality of spaced pairs of aligned side holes 18.

Figure 3:
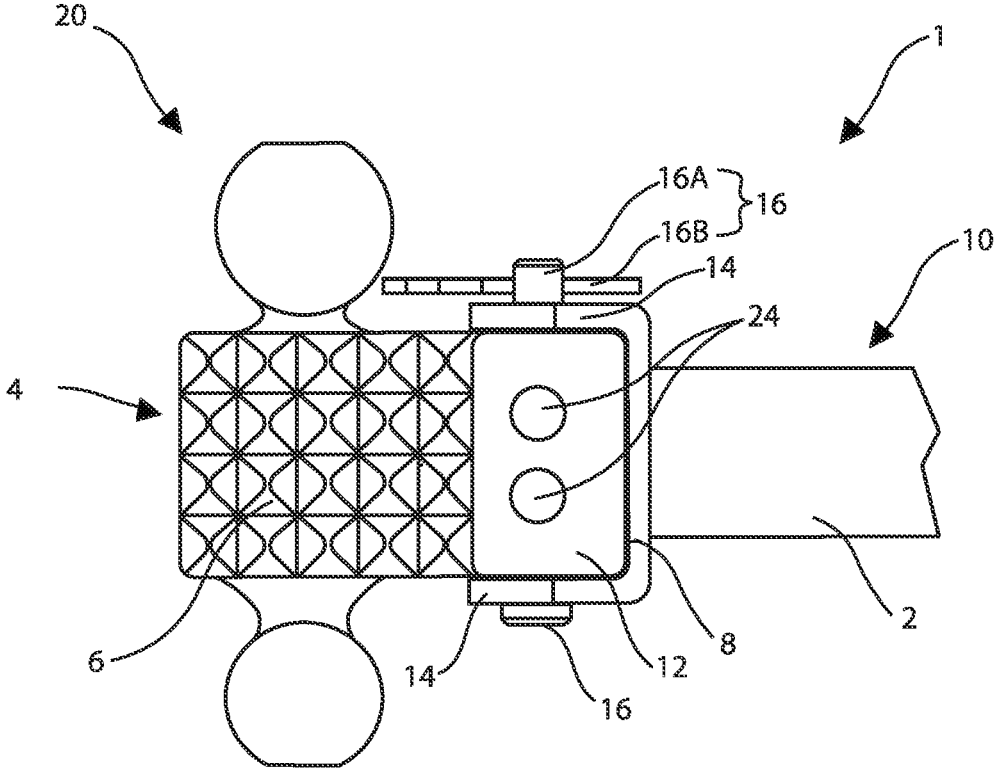
FIG. 3 is a bottom view of the first exemplary embodiment shown in FIG. 1 with the step hitch in an upward facing position.
Figure 4:
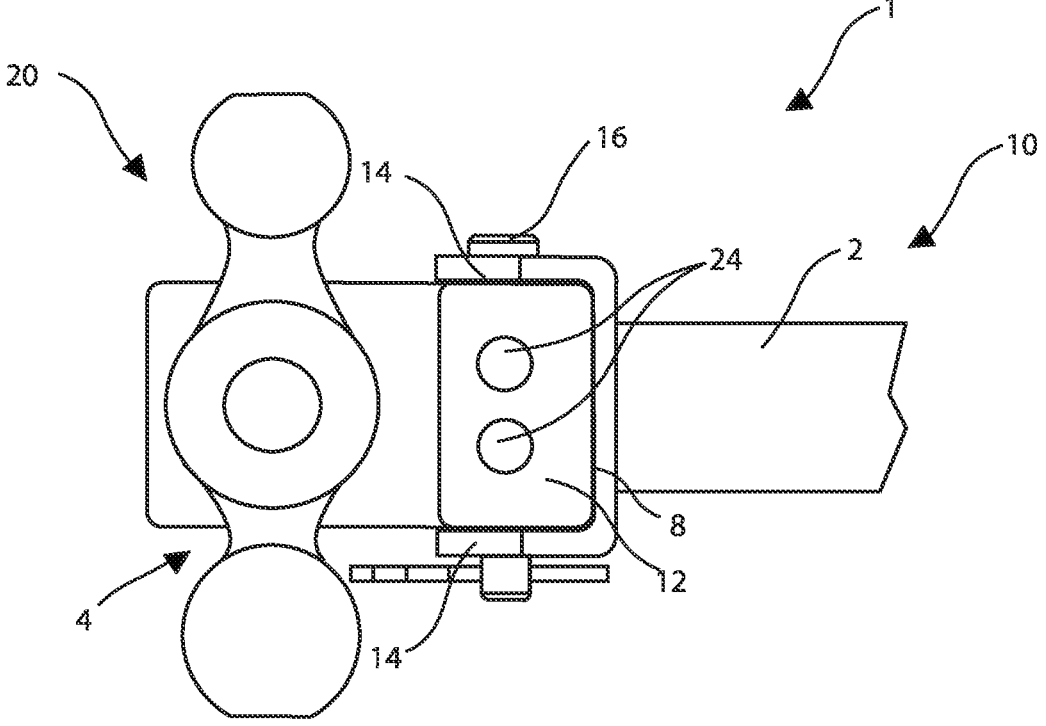
FIG. 4 is a top view of the exemplary embodiment in the position shown in FIGS. 1 and 3.
Figure 5:
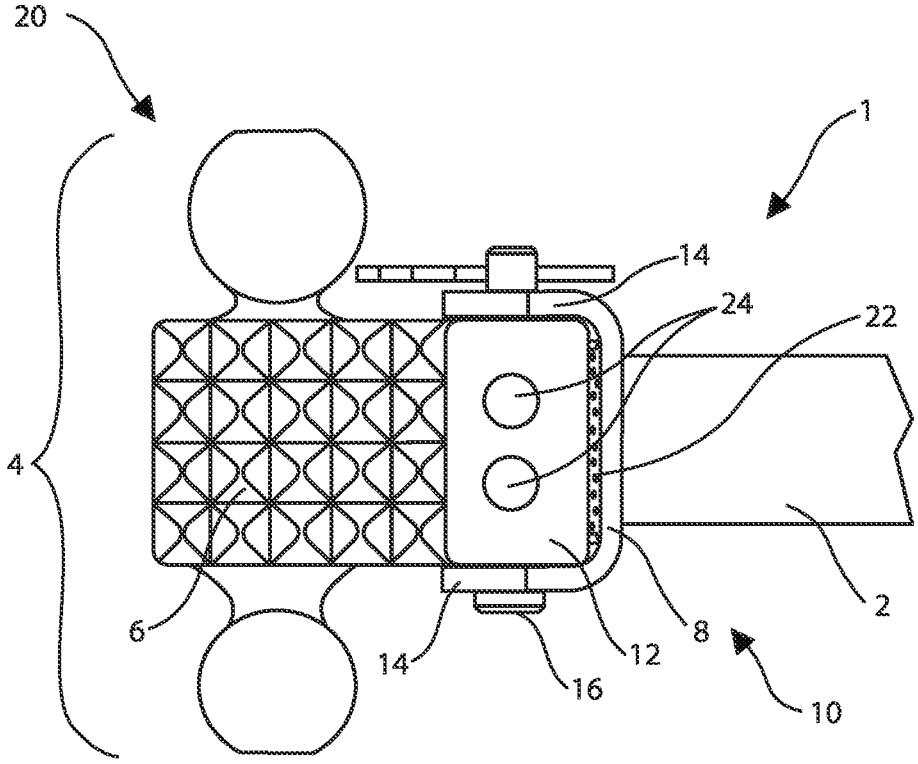
FIG. 5 is a bottom view of a fifth exemplary embodiment of a multiple hitch assembly including a dampener member.

The multiple hitch assembly 1 includes a multiple tow mount member 20 that, as best shown in FIGS. 3-5, has a block base 12 with a planar rear face and opposed side walls configured for squarely aligned slidable correspondence within opposed flanges 14 and a recessed column of channel member 8.

Figure 2:
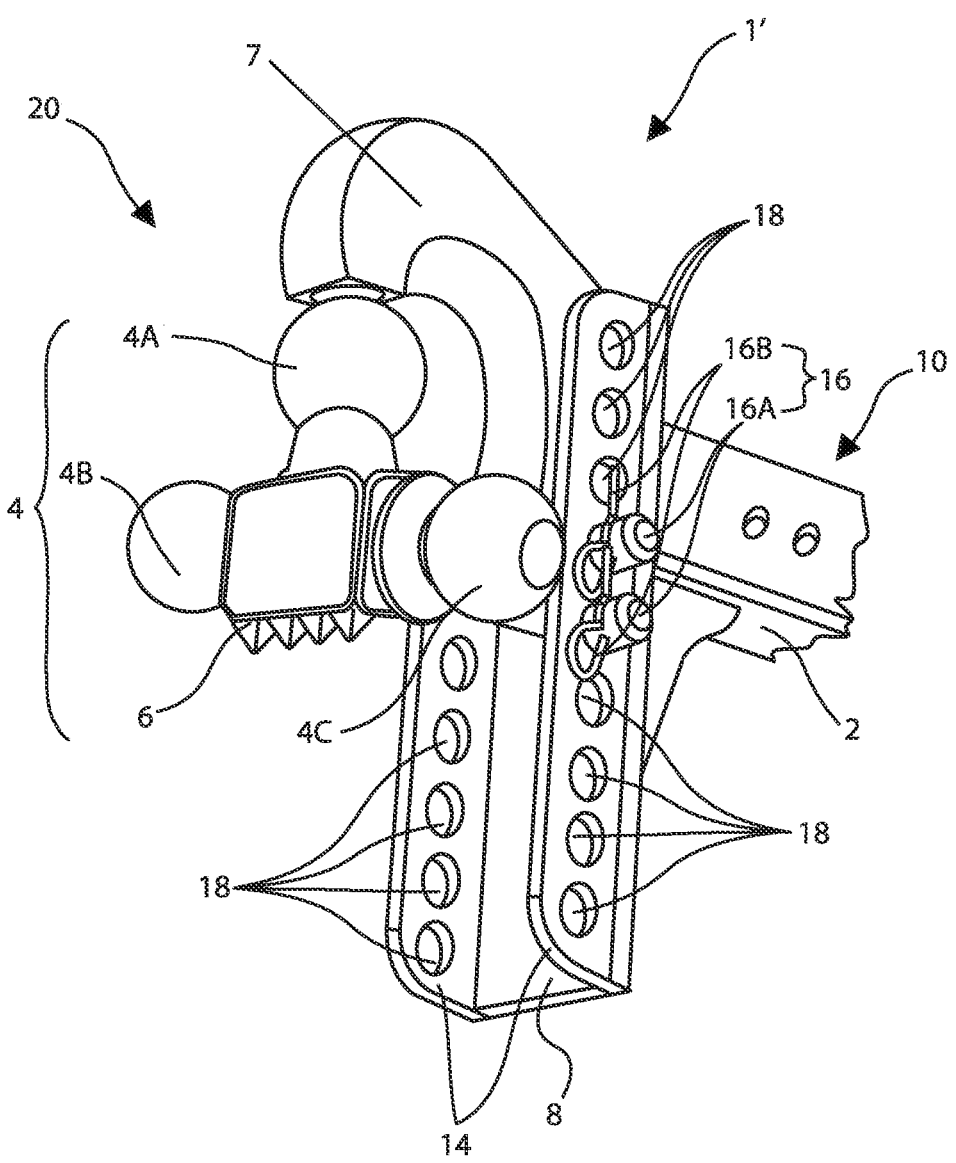
FIG. 2 is a side perspective view of a third embodiment of a multiple hitch assembly.

As most clearly illustrated in FIGS. 1-3, multiple tow mount member 20 further includes receiver end 4 opposite to the rear surface having a planar portion. Receiver end 4 includes a plurality of various tow accessory mounts.

Various embodiments of the multiple hitch assembly may deploy two, three or more hitch receiver balls of differing diameters. As shown in FIG. 2, some embodiments include a pintle hook 7 for secured coupling of a hitch ball 4A. Various embodiments configure a fastening member 16 for detachably coupling the through holes so as to rotatably orient an one of the plurality of tow accessory mounts in an upward use position while the hitch platform is in coupled engagement with the tow vehicle.

Figure 1B:
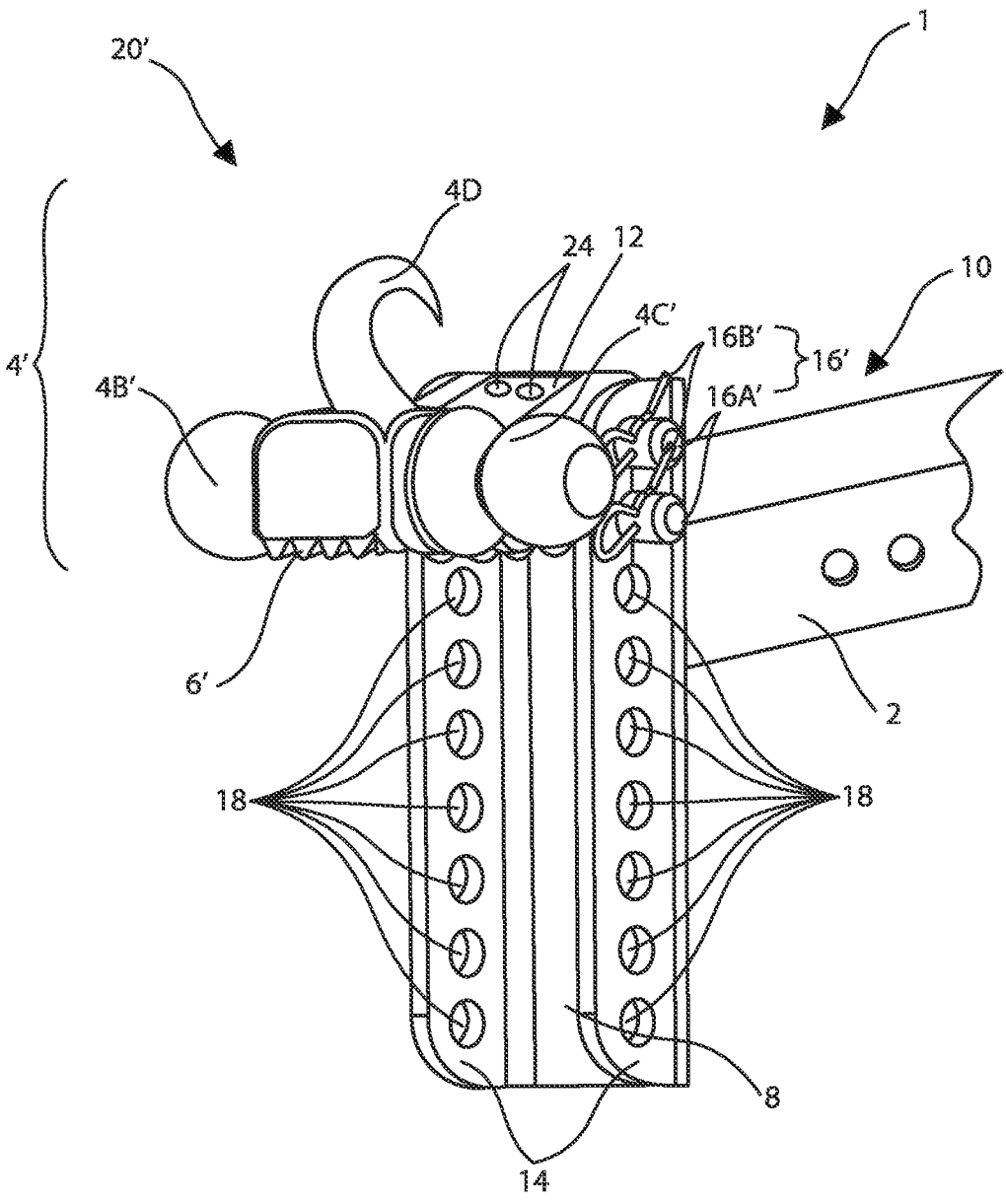
FIG. 1B is a side perspective view of another exemplary embodiment of the multiple hitch assembly of the present invention depicting the concealed dampener member in dashed lines.

As shown in FIG. 1A, receiver end 4 of tow mount member 20 may include hitch receiver balls 4A, 4B and/or 4C and step member 6. FIG. 1B shows an alternative embodiment wherein tow mount member 20' features receiver end 4' includes hook member 4D opposite step member 6' and perpendicularly disposed from hitch balls 4B' and 4C' aligned along a linear axis. Now referring to FIGS. 2 and 2B, hitch assembly 1" provides tow mount member 20" that further includes pintle hook 7, 7" for securing a hitch ball 4A", 4B", 4C" or other tow receiver of receiver end 4".

Now referring to FIGS. 1-6 conjunctively, a plurality of paired through holes 24 are disposed through a rotational axis of block base 12 and configured such that aligned correspondence with side holes 18 of flange members 14 positions an one of the plurality of tow accessory mounts on tow mount receiver end 4 in an upward facing use position.

Now referring to FIGS. 1-5, the illustrated embodiments further include fastening member 16 configured for coupling through holes 24 of block base 12 between paired side holes 18 disposed in flanges 14 of channel member 8. Coupled engagement of fastening member 16 with through holes 24 and side holes 16 squarely aligns block base 12 within channel member 8 such that no portion of block base 12 extends beyond an end of the channel member 8, as best shown in FIGS. 3-5. Such squared and aligned engagement of block base 12 within the peripheries of channel member 8 simultaneously compresses the corresponding opposed surface area of the side walls and the planar portion of the rear surface of block base 12 against the opposed flanges and recessed column of channel member to thereby reduce movement and associated noise between abutted surfaces thereof.

In such illustrated embodiments, fastening member 16 includes clip pins 16A, commercially known as cotter pins, configured for coupled engagement with corresponding aligned side holes 18 and through holes 24, wherein a clip 16B is secured in locked engagement with a corresponding clip hole so as to secure tow mount member 20/20" within channel member 8 of hitch platform 10.

Rotatable orientation and subsequent secured coupled engagement of fastening member 16 through aligned side holes 18 and through holes 24 to position step 6 in an upward facing position facilitates ready access to a rooftop surface and elevated objects. The step may in various embodiments be configured in a parallelogram, oval or curvilinear shape that can be configured for accommodating one or both feet of a user.

The exemplary embodiment as best shown in FIGS. 3 and 5 is configured with a substantially rectangular shape and sized to accommodate at least part of a user's foot sole. It can be readily surmised that in alternative embodiments the step member may be variously dimensioned to facilitate a desired function or design.

Figure 2B:
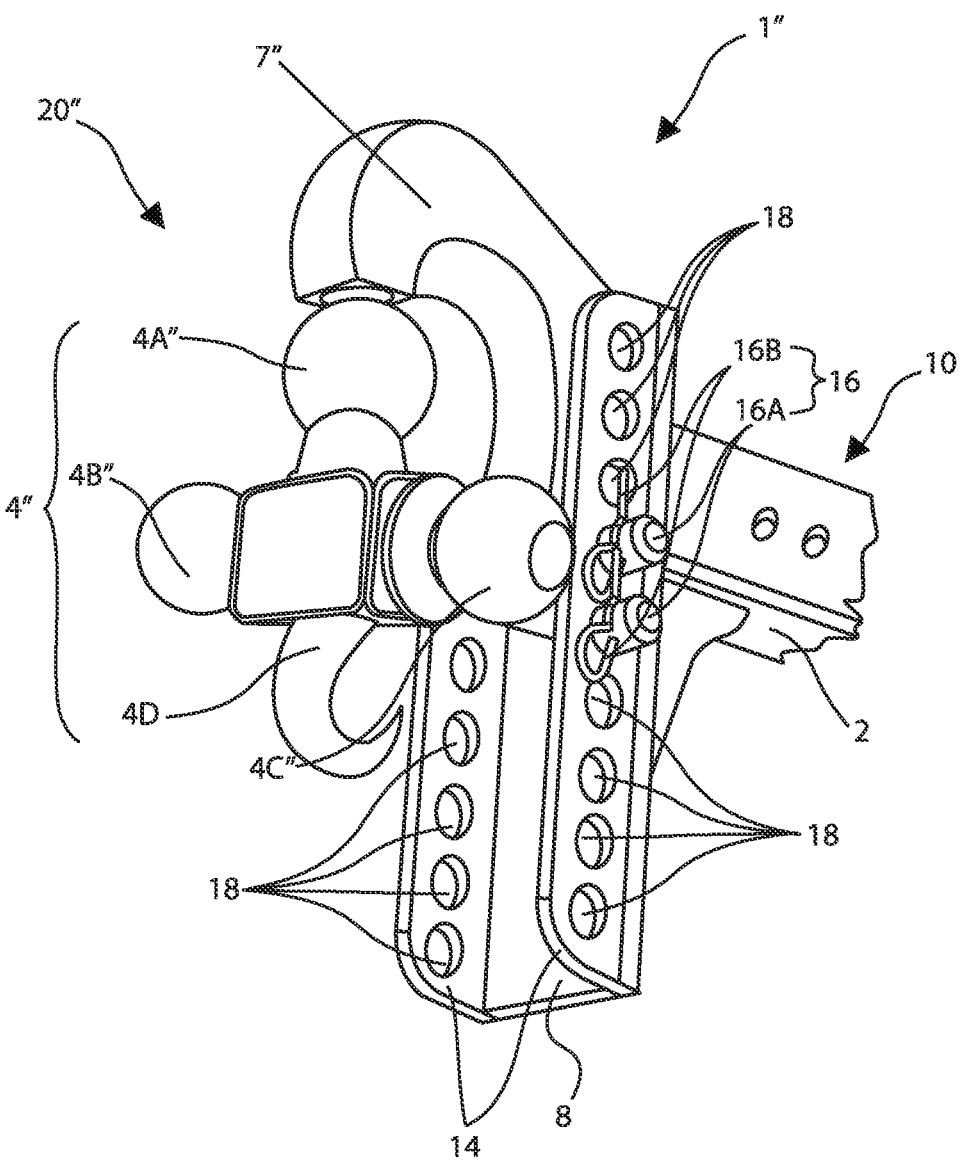
FIG. 2B is a side perspective view of a fourth embodiment of a multiple hitch assembly.

In some embodiments such as shown in FIGS. 1, 3 and 5, step member 6 may be disposed outwardly along a linear axis from hitch ball receiver 4A and between hitch receiver ball 4B and hitch receiver ball 4C disposed outwardly along a linear axis. In other embodiments such as shown in FIGS. 1B and 2B, multiple tow mount member 20 may include a tow hook member 7 disposed between the two opposed hitch receiver balls 4B, 4C and disposed outwardly from hitch receiver ball 4A.

Figure 6:
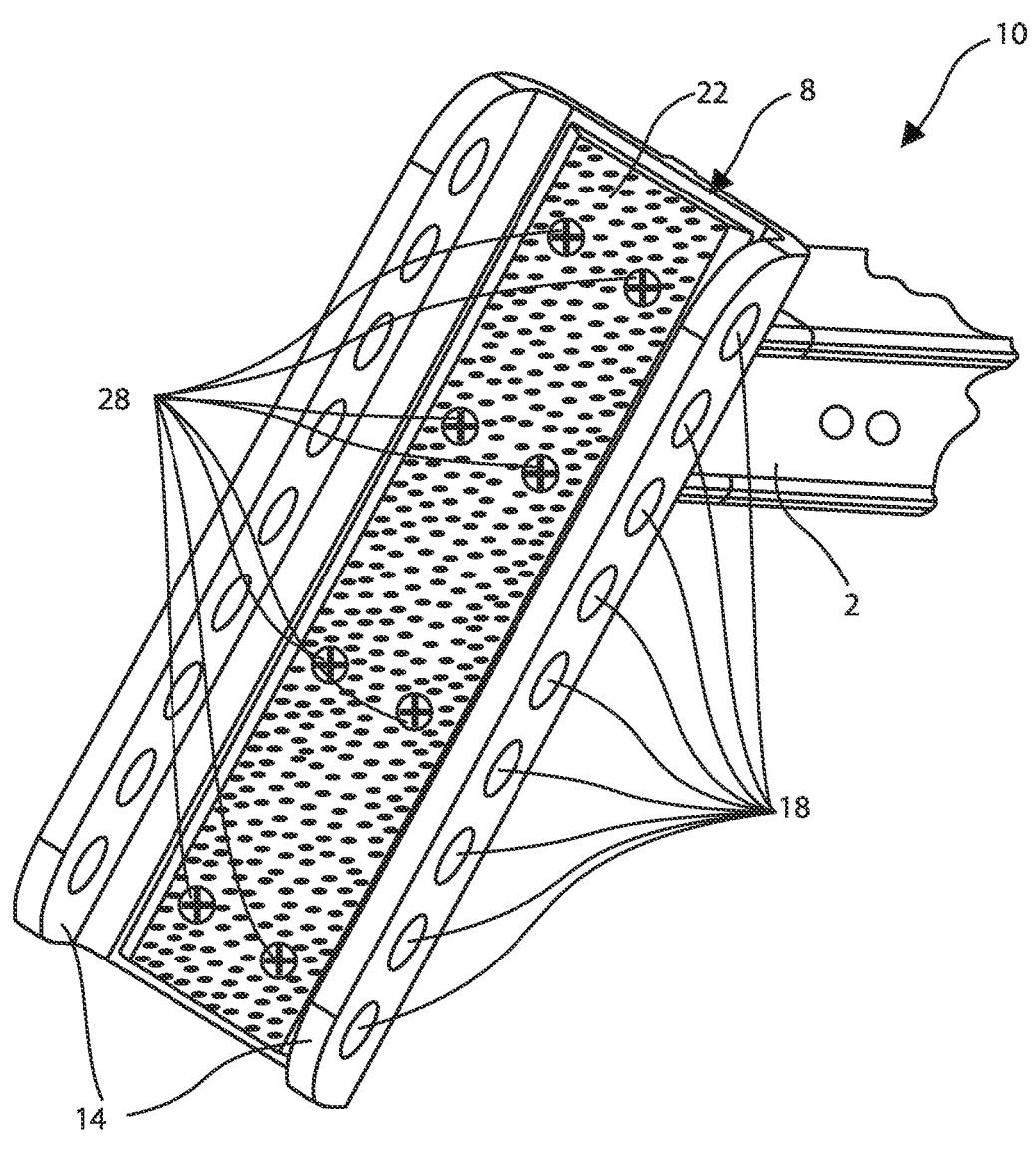
FIG. 6 is a side perspective view of the hitch platform member of the fifth embodiment shown in FIG. 5.

Now referring to FIGS. 5 and 6, various embodiments further affix a dampener member 22 to a portion of the corresponding opposed surfaces of the block base 12 of the multiple tow mount member 20 or the recessed column of the channel member 20 such that squared coupling of the at least one fastening member of the through hole of the base block between the aligned side holes compresses the dampener member upon the planar rear surface of the base block so as to reduce movement and rubbing therebetween.

Some embodiments include dampener member 22 affixed onto the rear surface of a block base of a multiple tow mount member such as, for example, a dual or triple ball hitch mount or receiver. In other embodiments, dampener member 22 may be affixed to an inner surface of the recessed column disposed between opposed flanges of a hitch platform. According to the present invention, dampener member 22 is affixed to the rear planar surface of the block base 12 of tow mount member 20 or recessed column of shank hitch platform 10 such that dampening of movement and frictional rubbing of corresponding opposed surfaces is deployable in any position regardless height adjustments thereto.

In various embodiments, dampener member 22 is affixed to at least a portion of the recessed column that includes an area of within 1 inch of an upper edge of channel member 8, at least a portion within 1 inch of a lower edge of channel member 8 and at least a portion within 1 inch of an abutment of the interior side wall of the pair of flanges. In some embodiments, dampener member 22 may include a hollow center portion.

In other embodiments, dampener member 22 may be affixed by a single metal screw or multiple screws, adhered, embedded, inlaid, fused, coated or fixed by coating, painting, spraying or utilizing other means or materials well known in the art.

Some embodiments provide a detachable dampener member that may be applied to original equipment lacking the dampener member.

Representative embodiments of such multiple hitch assemblies particularly suitable for after-market applications includes a combination of rubber and metal screw thread configured to engage a corresponding threaded hole the back surface of a corresponding base block or inner surface of a hitch platform recessed column.

As illustrated in FIG. 6, dampener member 22 may be affixed to the recessed column of channel mount 8 with a plurality of screws 28. In alternative embodiments, dampener member 22 may be affixed by adhesion, fusion or coating. In some embodiments, dampener member 22 is detachable.

The scope of the claimed invention extends to other mount assemblies including but not limited to single or multiple hitch balls of differing diameters, hook mounts, step mounts, pintle hooks, clasps, chain links or any tow accessory mount adaptable to trailers, platforms, racks, and containers for cargo, bicycles, motorcycles, wheelchairs, carriers and other types of receiver mounted devices.

The composition of the dampener member 22 is preferably a polymeric rubber material. However, the dampener member 22 may be composed of any elastomer, or pliable, impact or vibration-absorbing material of suitable density, flex, and durability and is functionally adaptable to dampen, buffer, dissipate or attenuate, a vibration, impact, shock, stress, strain or torque exerted by an external force. The impact absorbing or dampening composition of vibration dampener pad 22 is configurable in any suitable size and shape such as, for example, a curved or circular device, bumper, washer, block, sheet, sleeve or other form that is adaptable to the geometry of the tow hitch platform and mount member.

Moreover, the shape of the hitch dampener pad of the present invention can take on various configurations which may include linear, curvilinear, hollow, convex or concave portions. The scope of the present invention expressly contemplates and includes any shape as well as composition providing the impact and vibration absorbing or attenuation, the extent of which may correspond to the hitch dampener pad composition's mechanical properties, including without limitation, vibration and impact absorption capacity, pliability, tensile strength and density.

As will be apparent to persons of ordinary skill in the art of tow hitch assembly design and engineering, the extent and impact receiving and attenuation capacity of the device of the present invention correlates to the dampener surface area, thickness and density. More specifically, the vibration dampener pad 22 surface area, thickness and density comport with the connection tension of the hitch vibration dampening assembly exerted which is a function of the weight, shape and size, aerodynamics as well as force and torque exerted on the tow hitch assembly when in use.

It is to be expressly understood that the descriptive embodiment is provided herein for explanatory purposes only and is not meant to unduly limit the claimed invention. Various embodiments of the present invention is intended for use with receiver hitch systems including trailer mounts as well as other tow accessories. Some embodiments may be used for original equipment installations and as an after-market item.

Hence, it is to be further expressly understood that these exemplary embodiments are provided for descriptive purposes only and not meant to unduly limit the scope of the claimed inventions. Other embodiments are also considered to be within the scope of the present inventions.

The invention claimed is:

1. A multiple hitch assembly for hitching a tow accessory to a vehicle, comprising:
   a hitch platform having
   a shank tube member with an elongate end portion configured for telescoped coupled engagement within a receiver tube attached to the tow vehicle,
   a channel member having a recessed column disposed between a pair of opposed flanges, wherein the shank tube member is affixed to a back surface of the recessed column such that the channel member is longitudinally disposed along a substantially perpendicular axis opposite the elongate end portion of the shank tube,
   a plurality of paired side holes transversely aligned in the opposed flanges;
   a tow mount member having a block base configured for slidable correspondence within the opposed flanges and recessed column of the channel member, wherein the block base has a rear surface disposed between opposed side walls having a planar portion, and a receiver end opposite to the rear surface, wherein the receiver end includes a plurality of tow accessory mounts, and wherein at least one through hole is disposed through the block base, wherein the at least one through hole is positioned such that aligned correspondence with a selected pair of the paired side holes of the flange members positions one of a plurality of tow accessory mounts in an upward facing use position; and
   at least one fastening member configured for coupling the at least one through hole of the block base between the paired side holes of the channel member, wherein coupled engagement of the fastening member with at least one of the plurality of paired through holes and paired side holes squarely aligns the block base within the channel member such that at least a portion of the side walls and at least a portion of the planar portion of the rear surface of the block base are simultaneously compressed against a corresponding abutted surface of the opposed flanges and recessed column of the channel member.

2. The multiple hitch assembly of claim 1, wherein the plurality of tow accessory mounts includes at least two hitch receiver balls of differing diameters.

3. The multiple hitch assembly of claim 2, wherein the at least two hitch receiver balls of differing diameters comprises three hitch receiver balls of differing diameters.

4. The multiple hitch assembly of claim 2, wherein the plurality of tow accessory mounts further comprises a hook member, a step member or a pintle hook.

5. The multiple hitch assembly of claim 1, wherein the block base is dimensioned such that the planar portion of the rear surface is perpendicularly disposed between outer surfaces of opposed side walls, and wherein the plurality of paired through holes are in paired alignment such that the planar portion of the rear surface is compressed against the recessed column of the channel member when the locking member is in coupled engagement with the tow vehicle.

6. The multiple hitch assembly of claim 2, wherein the rear surface further comprises a recessed portion.

7. The multiple hitch assembly of claim 1, wherein the planar portion is perpendicularly disposed atop a pair of aligned rails longitudinal to the opposed sidewalls of the block base and wherein the at least one through hole are a pair of aligned through holes disposed in the aligned rails.

8. The multiple hitch assembly of claim 1, wherein no portion of the block base extends beyond a top end and a bottom end of the channel member when the fastening member is in coupled engagement.

9. The multiple hitch assembly of claim 1, wherein a dampener member is affixed upon at least a portion of the rear surface.

10. The multiple hitch assembly of claim 9, wherein the dampener member is affixed to at least a portion of the planar portion.

11. The multiple hitch assembly of claim 1, further comprising a dampener member affixed to at least a portion of the recessed column such that the dampener member is compressed upon the planar portion of the rear surface of the block base when the fastening member is in coupled engagement.

12. The multiple hitch assembly of claim 9, wherein the dampener member is affixed with at least one screw.

13. The multiple hitch assembly of claim 11, wherein the dampener member is affixed by adhesion, fusion or coating.

14. The multiple hitch assembly of claim 11, wherein the dampener member is detachably affixed.

15. The multiple hitch assembly of claim 1, further comprising a dampener material affixed to at least a portion of the planar portion and wherein the portion is an area extending from a center of the rear surface to within 1 inch of an upper edge, within 1 inch of a lower edge or at least a portion within 1 inch of the opposed side walls.

16. The multiple hitch assembly of claim 15, wherein the dampener material includes a hollow portion.

17. The multiple hitch assembly of claim 1, wherein the rear surface includes non-planar portions.

18. The multiple hitch assembly of claim 7, further comprising two clip pins and the plurality of paired through holes are two pairs of paired through holes disposed perpendicularly through aligned rails.

19. A multiple hitch assembly for hitching a tow accessory to a vehicle, comprising:

a hitch platform having a shank tube member with an elongate end portion configured for telescoped coupled engagement within a receiver tube attached to the tow vehicle, a channel member having a recessed column disposed between opposed flanges, wherein the shank tube member is affixed to a back surface of the recessed column such that the channel member is longitudinally disposed along a substantially perpendicular axis opposite the elongate end portion, a plurality of paired side holes transversely aligned in the opposed flanges;

a tow mount member having a block base configured for slidable correspondence within the opposed flanges and recessed column of the channel member, wherein the block base has a planar rear surface and a receiver end opposite to the planar rear surface, wherein the receiver end includes a plurality of tow accessory mounts radially disposed in different directions from a pedestal, and wherein a plurality of through holes are disposed through the block base, wherein the plurality of through holes are configured such that aligned correspondence with the side holes of the flange members positions an-one of the plurality of tow accessory mounts in an upward facing use position;

at least one fastening member configured for coupling at least one of the plurality of through holes of the block base with corresponding paired side holes of the channel member, wherein coupled engagement of the fastening member with at least one of the plurality of through holes and corresponding paired side holes squarely aligns the block base within the channel member such that side walls and the planar rear surface are simultaneously compressed against corresponding opposed surfaces of the opposed flanges and recessed column of the channel member whereby no portion of the block base extends beyond a top end and a bottom end of the channel member when the fastening member is in coupled engagement; and a dampener member affixed along at least a portion of the recessed column such that squared coupling of the at least one fastening member with the through hole of the block base between the paired side holes compresses the dampener member against the planar rear surface of the block base.

20. The multiple hitch assembly of claim 19, wherein the dampener member is affixed by adhesion, fusion or coating.

* * * * *